US011870181B2

(12) United States Patent
Kobayashi et al.

(10) Patent No.: US 11,870,181 B2
(45) Date of Patent: Jan. 9, 2024

(54) CONNECTOR INCLUDING LOCKING PORTION AND PROTRUSION PORTION ADJACENT TO LOCKING PORTION IN LOCKED STATE

(71) Applicant: YAZAKI CORPORATION, Tokyo (JP)

(72) Inventors: Tooru Kobayashi, Makinohara (JP); Nobuyuki Mukoujima, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 77 days.

(21) Appl. No.: 17/726,576

(22) Filed: Apr. 22, 2022

(65) Prior Publication Data

US 2022/0344855 A1 Oct. 27, 2022

(30) Foreign Application Priority Data

Apr. 22, 2021 (JP) ................................ 2021-072253

(51) Int. Cl.
*H01R 13/62* (2006.01)
*H01R 13/627* (2006.01)
*H01R 13/436* (2006.01)

(52) U.S. Cl.
CPC ..... *H01R 13/6272* (2013.01); *H01R 13/4365* (2013.01)

(58) Field of Classification Search
CPC ........................................ H01R 13/6272–6275
See application file for complete search history.

(56) References Cited

U.S. PATENT DOCUMENTS

| | | | |
|---|---|---|---|
| 5,252,096 A | 10/1993 | Okada | |
| 5,848,919 A | 12/1998 | Nagano | |
| 6,234,826 B1 | 5/2001 | Wilber et al. | |
| 8,506,321 B2 * | 8/2013 | Hanyu .............. | H01R 13/6273 439/370 |

FOREIGN PATENT DOCUMENTS

| | | | |
|---|---|---|---|
| EP | 0795934 | A2 | 9/1997 |
| EP | 3913750 | A1 | 11/2021 |
| JP | H01-68679 | U | 5/1989 |
| JP | 2018-195401 | A | 12/2018 |

* cited by examiner

*Primary Examiner* — Ross N Gushi
(74) *Attorney, Agent, or Firm* — KENEALY VAIDYA LLP

(57) ABSTRACT

There is provided a connector including: a protrusion portion provided on a second housing at a position close to and facing a distal end portion of a locking portion in a locked state in which the locking portion is locked to a locked portion, so that the protrusion portion restricts an action of an external force on the distal end portion of the locking portion in the locked state.

7 Claims, 6 Drawing Sheets

CONNECTOR INCLUDING LOCKING PORTION AND PROTRUSION PORTION ADJACENT TO LOCKING PORTION IN LOCKED STATE

This application is based on and claims priority under 35 USC 119 from Japanese Patent Application No. 2021-072253 filed on Apr. 22, 2021, the contents of which are incorporated herein by reference.

TECHNICAL FIELD

The present disclosure relates to a connector.

BACKGROUND ART

As a related art, JP2018-195401A describes a connector.

As shown in FIGS. 6A and 6B, a connector 100 is a resin connector formed by male-female fitting, and includes a recessed first housing 101 that is formed in a recessed shape and configures a female connector, and a protruded second housing 102 that is provided so as to be able to be fitted to the first housing 101 and configures a male connector.

An outer side portion of the first housing 101 is provided with a hook-shaped locking portion 101*a* cantilevered toward the second housing 102, and an outer side portion of the second housing 102 is provided with a recessed locked portion 102*a* with which the locking portion 101*a* of the first housing 101 can be locked.

That is, by locking the locking portion 101*a* to the locked portion 102*a*, the first housing 101 and the second housing 102 are fixed (locked) in a fitted state, and the fitted state of the first housing 101 and the second housing 102 is maintained.

However, in a case of the connector in the related art, the locking portion 101*a* of the first housing 101 and the locked portion of the second housing 102 in a locked state are exposed to an outside without being protected at all. Therefore, for example, the locking portion 101*a* may be lifted by an external factor acting on an outside of the first housing 101 and the second housing 102, such as a distal end portion of the locking portion 101*a* being caught by something, the locked state of the locking portion 101*a* with respect to the locked portion 102*a* may be released, and there is still room for improvement.

SUMMARY OF INVENTION

The present disclosure provides a connector capable of preventing unintended release of a locked state of a first housing and a second housing due to an external factor.

According to an illustrative aspect of the present disclosure, a connector includes: a first housing that accommodates a terminal fitting; a second housing that is inserted into the first housing to be fitted to the first housing; a locked portion provided on one side surface of the second housing; a locking portion that is provided flexibly and deformably on one side surface of the first housing that faces the one side surface of the second housing and is locked to the locked portion to move over the locked portion by becoming deformably bent along with the first housing and the second housing being fitted with each other; and a protrusion portion provided on the second housing at a position close to and facing a distal end portion of the locking portion in a locked state in which the locking portion is locked to the locked portion, the protrusion portion being configured to restrict an action of an external force on the distal end portion of the locking portion in the locked state.

DESCRIPTION OF EMBODIMENTS

Hereinafter, an embodiment of a connector according to the present disclosure will be described in detail with reference to the drawings.

(Configuration of Connector)

Figure 3:
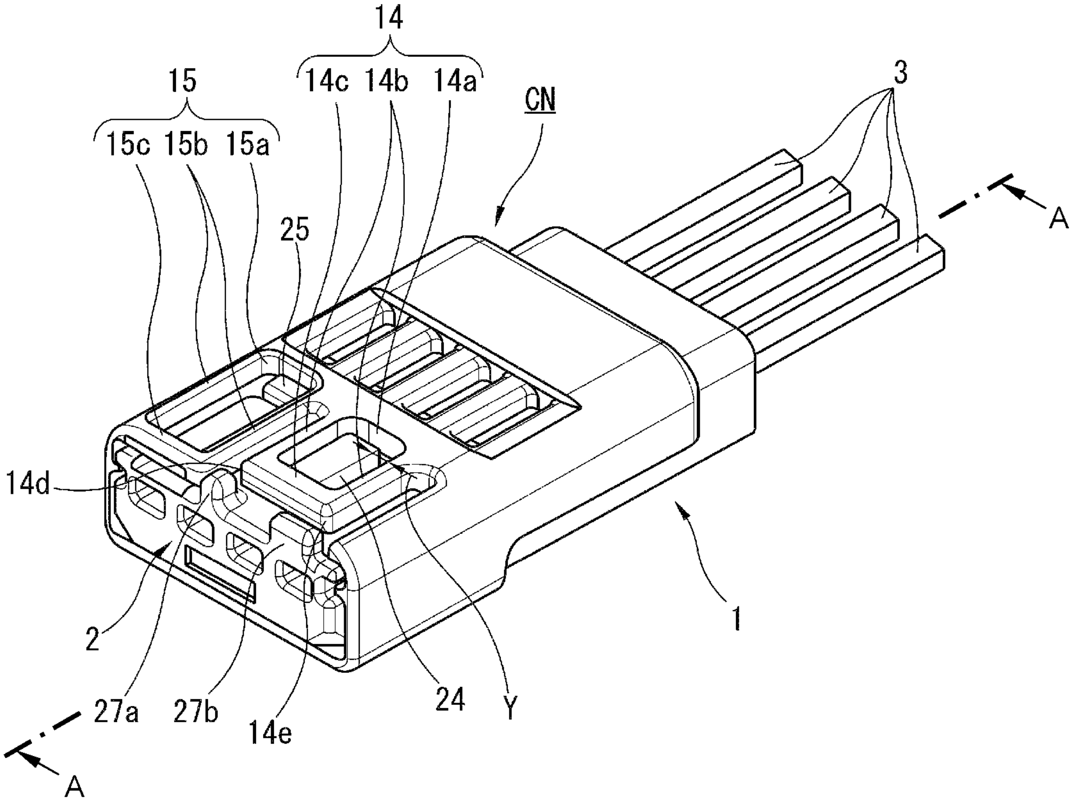
FIG. 3 is a perspective view showing an assembled state of the connector shown in FIG. 1.
Figure 4:
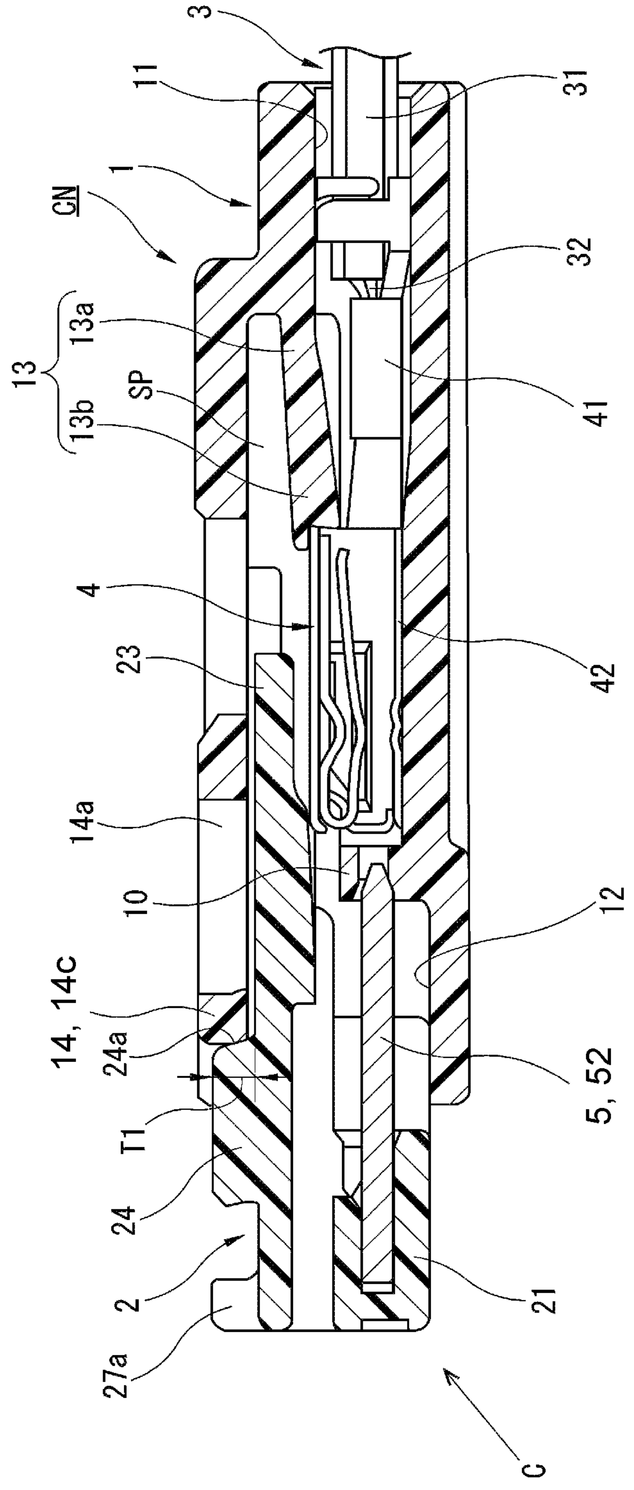
FIG. 4 is a view showing a temporarily assembled state of the first housing and the second housing shown in FIG. 1, and is a longitudinal sectional view of the connector taken along an insertion direction of the second housing so as to pass through a full locking portion and a full locking protrusion.

A specific configuration of a connector CN according to the present embodiment will be described in detail with reference to FIGS. 1 to 5. In description of the drawings, for the sake of convenience, a side of a first housing 1 facing a second housing 2 is defined as “front”, and a side opposite to the front is defined as “rear”. Meanwhile, a side of the second housing 2 facing the first housing 1 is defined as “front”, and a side opposite to the front is defined as “rear”. Further, a direction corresponding to an upper side of a paper surface in FIGS. 4 and 5 is defined as “upper”, and a direction corresponding to a lower side of the paper surface is defined as “lower”.

Figure 1:
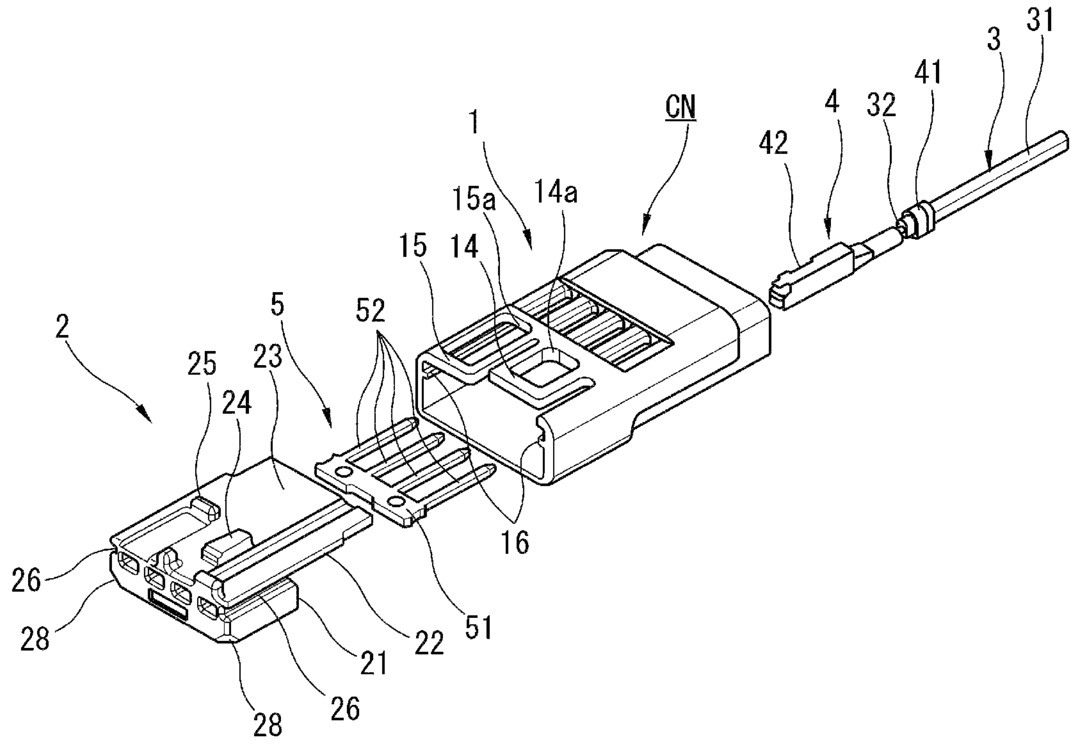
FIG. 1 is an exploded perspective view of a connector according to a first embodiment of the present disclosure.
Figure 5:
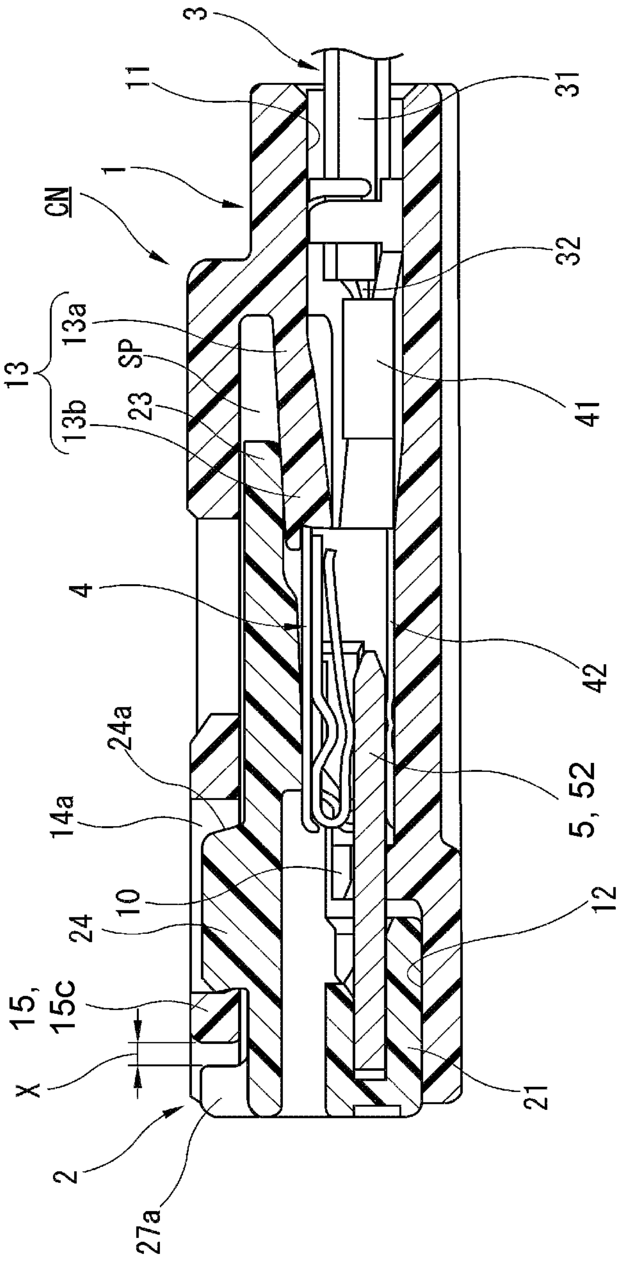
FIG. 5 is a cross-sectional view taken along a line A-A of FIG. 3.

For example, as shown in FIGS. 1 and 5, the connector CN includes the first housing 1 including a plurality of (four in the present embodiment) female terminal accommodating portions 11 for accommodating female terminals 4 severing as terminal fittings connected (caulked and fixed) to electric wires 3, and the second housing 2 that accommodates a bus bar 5 including a plurality of (four in the present embodiment) male terminals 52 respectively fittable to the female terminals 4 and is provided so as to be fittable to the first housing 1. In other words, the connector CN exemplified in the present embodiment is a so-called “joint connector” in which the plurality of female terminals 4 are electrically connected to each other via the bus bar 5.

The first housing 1 is formed of a synthetic resin material having an insulating property in a substantially rectangular tube shape, and is provided with the female terminal accommodating portions 11 that accommodates the female terminals 4 on a rear end side and a second housing receiving portion 12 that receives the fitted second housing 2 on a front end side. More specifically, the first housing 1 is provided with a vertically extending partition wall 10 at an intermediate portion in a front-rear direction, the female terminal accommodating portions 11 are defined behind the partition wall 10, and the second housing receiving portion 12 is defined in front of the partition wall 10.

The female terminal accommodating portions 11 are defined so as to have a substantially rectangular shape in a cross section capable of accommodating the female terminals 4 having a rectangular tube shape to be described later, and in the present embodiment, the four female terminal accommodating portions 11 are arranged in parallel in a width direction of the first housing 1. Meanwhile, the second housing receiving portion 12 has a recessed shape corresponding to the second housing 2 to be received, and is integrally formed across the whole first housing 1 in the width direction.

As shown in FIGS. 4 and 5, a lance portion 13 used for preventing the female terminals 4 from coming off by being locked to the female terminals 4 is provided on an upper portion of the first housing 1 configuring each of the female terminal accommodating portions 11. The lance portion 13 is formed in a cantilever shape extending from the rear to the front, is provided to be flexible and deformable in an up-down direction with a base end portion 13*a* as a fulcrum, and a distal end portion 13*b* can be locked to rear end edges of terminal connection portions 42 (to be described later) of the female terminals 4.

More specifically, as shown in FIG. 4, when the female terminals 4 are inserted, the lance portion 13 is elastically deformed so as to be pushed away upward, and then elastically returns to be locked to the rear end edges of the terminal connection portions 42 (to be described later) of the female terminals 4, thereby restricting rearward movement of the female terminals 4. As shown in FIG. 5, when the second housing 2 is completely fitted to the first housing 1, upward movement (bending deformation) of the lance portion 13 is restricted by a locking lance restricting portion 23 (to be described later) of the second housing 2, and the female terminals 4 are prevented from coming off.

Further, a full locking portion (corresponding to a locking portion according to the present disclosure) 14 used for configuring a fully assembled state (see FIG. 5) of the first housing 1 and the second housing 2 is formed on one side of an upper portion of the first housing 1 in the width direction configuring the second housing receiving portion 12. In the fully assembled state, the first housing 1 and the second housing 2 are deeply fitted to each other, and the second housing 2 (lance restricting portion 23 to be described later) restricts bending deformation of the lance portion 13, thereby preventing the female terminals 4 from coming off. As shown in FIGS. 1 and 3, the full locking portion 14 has a substantially rectangular frame shape that defines a full locking opening 14*a*, and includes a pair of cantilever-shaped full locking arm portions 14*b* and 14*b* parallel to each other and linearly extending forward, and a full locking piece 14*c* that is provided to connect distal end portions of the pair of full locking arm portions 14*b* and 14*b* to each other and can be locked to a full locking protrusion 24 (to be described later) of the second housing 2.

That is, as shown in FIG. 5, when the second housing 2 is to be fitted to the first housing 1, the pair of full locking arm portions 14*b* and 14*b* of the full locking portion 14 are bent and deformed upward to cause the full locking piece 14*c* to move over the full locking protrusion 24 (to be described later) of the second housing 2 to be locked to a rear end portion of the full locking protrusion 24, whereby the full assembled state in which the first housing 1 and the second housing 2 are deeply fitted to each other, and the female terminals 4 are prevented from coming off by the lance restricting portion 23 (to be described later) is maintained.

A temporary locking portion 15 used for configuring a temporarily assembled state (see FIG. 4) of the first housing 1 and the second housing 2 is formed on the other side of the upper portion of the first housing 1 in the width direction configuring the second housing receiving portion 12. In the temporarily assembled state, the first housing 1 and the second housing 2 are more shallowly fitted to each other than in the fully assembled state, and the second housing 2 (lance restricting portion 23 to be described later) does not restrict the bending deformation of the lance portion 13, thereby not preventing the female terminals 4 from coming off. As shown in FIGS. 1 and 3, the temporary locking portion 15 has a substantially rectangular frame shape that defines a long hole-shaped temporary locking opening 15*a* extending in the front-rear direction, and includes a pair of cantilever-shaped temporary locking arm portions 15*b* and 15*b* parallel to each other and linearly extending forward, and a temporary locking piece 15*c* that is provided to connect distal end portions of the pair of temporary locking arm portions 15*b* and 15*b* to each other and can be locked to a temporary locking protrusion 25 (to be described later) of the second housing 2.

That is, as shown in FIG. 4, when the second housing 2 is to be fitted to the first housing 1, the pair of temporary locking arm portions 15*b* and 15*b* of the temporary locking portion 15 are bent and deformed upward to cause the temporary locking piece 15*c* to move over the temporary locking protrusion 25 (to be described later) of the second housing 2 to be locked to a rear end portion of the temporary locking protrusion 25, whereby the temporarily assembled state in which the first housing 1 and the second housing 2 are fitted to each other shallower than in the fully assembled state, and the female terminals 4 are not prevented from coming off by the lance restricting portion 23 (to be described later) is maintained.

In this temporarily assembled state, as shown in FIG. 4, the temporary locking piece 15*c* is locked to the rear end portion of the temporary locking protrusion 25 immediately moving over the temporary locking protrusion 25 (to be described later) of the second housing 2, thereby preventing the second housing 2 from coming off from the first housing 1, while as shown in FIG. 5, the full locking piece 14*c* is in contact with a front end portion of the full locking protrusion 24 immediately before moving over the full locking protrusion 24 (to be described later) of the second housing 2, thereby not preventing the female terminals 4 from coming off by the lance restricting portion 23 to be described later.

The second housing 2 is integrally formed of a synthetic resin material having an insulating property, and includes, for example, as shown in FIGS. 1 and 5, a bus bar holding portion 21 that accommodates and holds a base portion 51 of the bus bar 5, a rectangular plate-shaped top plate portion 22 that is connected to an upper portion of the bus bar holding portion 21 and extends forward in parallel with the male terminals 52 of the bus bar 5, the lance restricting portion 23 that is formed in a tapered shape at a distal end portion (front end portion) of the top plate portion 22 and restricts the bending deformation of the lance portion 13 of the first housing 1, and a full locking protrusion (corresponding to a locked portion according to the present disclosure) 24 and a temporary locking protrusion (corresponding to a temporarily locked portion according to the present disclosure) 25 that are provided in parallel in the width direction on an upper face of the top plate portion 22.

Figure 2:
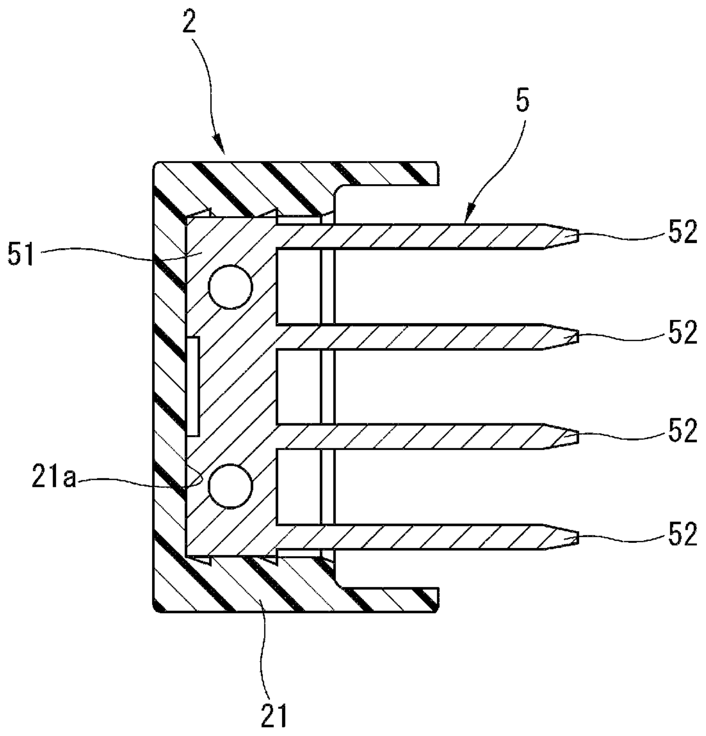
FIG. 2 is a longitudinal sectional view showing an assembled state of a second housing and a bus bar shown in FIG. 1.

As shown in FIG. 2, the bus bar holding portion 21 has a recess 21*a* having a substantially rectangular cross section and opening forward, and the base portion 51 of the bus bar 5 is press-fitted into the recess 21*a*, whereby the bus bar 5 is accommodated and held in a state where distal end sides of the male terminals 52 face an outside (forward).

As shown in FIGS. 4 and 5, the top plate portion 22 linearly extends forward to the vicinity of the distal ends of the male terminals 52 so as to cover an upper side of the bus bar 5. As shown in FIG. 1, a pair of guide grooves 26 for guiding the second housing 2 to be fitted into the first housing 1 are formed between the top plate portion 22 and the bus bar holding portion 21 on both side portions of the second housing 2. The pair of guide grooves 26 are engaged with a pair of linear guides 16 formed on both side portions of the second housing receiving portion 12 to guide the second housing 2 to be fitted into the first housing 1.

The lance restricting portion 23 is inserted into a lance deformation space SP for receiving upward deformation of the lance portion 13 of the first housing 1 in the fully assembled state in which the full locking protrusion 24 is locked to the full locking portion 14. That is, in this fully assembled state, the lance restricting portion 23 inserted into the lance deformation space SP comes into contact with an upper portion of the lance portion 13 to restrict the bending deformation of the lance portion 13. Accordingly, the state in which the lance portion 13 is locked to the rear end edges of the terminal connection portions 42 of the female terminals 4 is maintained, and the female terminals 4 are prevented from coming off.

The lance restricting portion 23 is allowed to enter the lance deformation space SP only in a state where the lance portion 13 is locked to the rear end edges of the terminal connection portions 42 of the female terminals 4, that is, in a state where the lance portion 13 is not deformed upward. In other words, when the insertion of the female terminals 4 into the first housing 1 is insufficient, the lance portion 13 moves on the terminal connection portions 42 of the female terminals 4, and the lance restricting portion 23 interferes with the lance portion 13 to restrict entry into the lance deformation space SP. With this configuration, the lance restricting portion 23 has a function of detecting the insufficient insertion of the female terminals 4, and proper insertion of the female terminals 4 into the first housing 1 is ensured in the fully assembled state in which the lance restricting portion 23 enters the lance deformation space SP and can restrict the bending deformation of the lance portion 13.

As shown in FIGS. 1 and 3, the full locking protrusion 24 has a substantially rectangular block shape and is formed integrally with the top plate portion 22. The full locking protrusion 24 is set to have a width dimension relatively smaller than a width dimension of the full locking portion opening 14*a*, and a predetermined gap Y (see FIG. 3) is formed between one of the pair of full locking arm portions 14*b* and 14*b* and one side surface of the full locking protrusion 24. As shown in FIG. 5, a front end portion of the full locking protrusion 24 is formed with a full locking tapered portion 24*a* configuring an inclined surface (tapered surface) in which a height dimension T1 of the full locking protrusion 24 gradually decreases toward the front. By the full locking tapered portion 24*a*, the full locking portion 14 (full locking piece 14*c*) is relatively easily lifted along the full locking tapered portion 24*a*, and the full locking portion 14 can be easily locked to the full locking protrusion 24 with a relatively small pressing force.

As shown in FIGS. 1 and 3, the temporary locking protrusion 25 has a substantially rectangular piece shape and is formed integrally with the top plate portion 22. Further, as shown in FIG. 4, a front end portion of the temporary locking protrusion 25 is formed with a temporary locking tapered portion 25*a* configuring an inclined surface (tapered surface) in which a height dimension T2 of the temporary locking protrusion 25 gradually decreases toward the front. By the temporary locking tapered portion 25*a*, the temporary locking portion 15 (temporary locking piece 15*c*) is relatively easily lifted along the temporary locking tapered portion 25*a*, and the temporary locking portion 15 can be easily locked to the temporary locking protrusion 25 with a relatively small pressing force.

As shown in FIG. 3 in particular, at a rear end edge of the top plate portion 22 on a front side of the second housing 2 in the insertion direction with respect to the full locking protrusion 24, a pair of a first protrusion portion 27*a* and a second protrusion portion 27*b* serving as a plurality of protrusion portions are provided at positions facing an inner corner portion 14*d* and an outer corner portion 14*e* serving as corner portions on both sides in the width direction of the full locking portion 14 in the insertion direction of the second housing 2 so as to overlap with a distal end edge of the full locking portion 14 full locking piece 14*c*) facing the top plate portion 22 in the locked state of the full locking portion 14 and the full locking protrusion 24. The first protrusion portion 27*a* and the second protrusion portion 27*b* are disposed outside the full locking protrusion 24 in the width direction of the second housing 2 and spaced apart from each other so as to be close to the full locking portion 14 with relatively small gaps X (see FIG. 5) therebetween in the fully assembled state, and are set to have the substantially same height as the full locking portion 14 (full locking piece 14*c*). Specifically, the first protrusion portion 27*a* and the second protrusion portion 27*b* are disposed at positions overlapping the distal end edge of the full locking portion 14 (full locking piece 14*c*) facing the top plate portion 22 in the insertion direction of the second housing 2 so as to be close to and face both side portions (the inner corner portion 14*d* and the outer corner portion 14*e*) of the distal end of the full locking portion 14, thereby preventing the external force acting on the outside of the second housing 2 from directly acting on the inner corner portion 14*d* and the outer corner portion 14*e* (in particular, lower end edges of the inner corner portion 14*d* and the outer corner portion 14*e* at which a lifting action of the full locking portion 14 can be generated) of the full locking portion 14.

Here, in the present embodiment, the second protrusion portion 27*b* of the first protrusion portion 27*a* and the second protrusion portion 27*b* is formed to be relatively wider than the first protrusion portion 27*a*, and is formed to be able to face not only the outer corner portion 14*e* of the full locking portion 14 but also the gap Y. According to this configuration, although not specifically shown, the relatively wide second protrusion portion 27*b* is provided for abutment of a jig (not shown) inserted so as to pass through the full locking piece 14*c* from the outside through the gap Y, and in this abutment state, the full locking piece 14*c* is lifted so as to scoop out the jig, whereby the locked state of the full locking portion 14 and the full locking protrusion 24 is released, and the first housing 1 and the second housing 2 can be disassembled (separated).

In the present embodiment, the dimension of the second protrusion portion 27*b* in the width direction is set to be larger than that of the first protrusion portion 27*a*, and sizes of the first protrusion portion 27*a* and the second protrusion portion 27*b* can be freely set. In other words, the dimensions of the first protrusion portion 27*a* and the second protrusion portion 27*b* in the width direction may be set to the same size, or the dimension of the first protrusion portion 27*a* in the width direction may be set to be larger than that of the second protrusion portion 27*b*.

The female terminals 4 are integrally formed of a predetermined conductive metal material, and include electric wire connecting portions 41 that are crimped to exposed core wire portions 32 obtained by removing a part of covering portions 31 at distal end portions of the electric wires 3, and the terminal connection portions 42 having a substantially rectangular tube shape that are integrally provided on distal end sides of the electric wire connecting portions 41 and fitted to the male terminals 52 to be connected to the male terminals 52.

The bus bar 5 is integrally formed by punching out a conductive metal plate, and particularly, as shown in FIGS. 1 and 2, includes the base portion 51 that is formed in a band shape over the width direction and is press-fitted and held in the bus bar holding portion 21 of the second housing 2, and the plurality of (four in the present embodiment) male terminals 52 that extend in parallel to each other from a front end portion of the base portion 51.

(Functions and Effects of Present Embodiment)

Hereinafter, functions and effects of the connector CN according to the present embodiment will be specifically described.

Figure 6A:
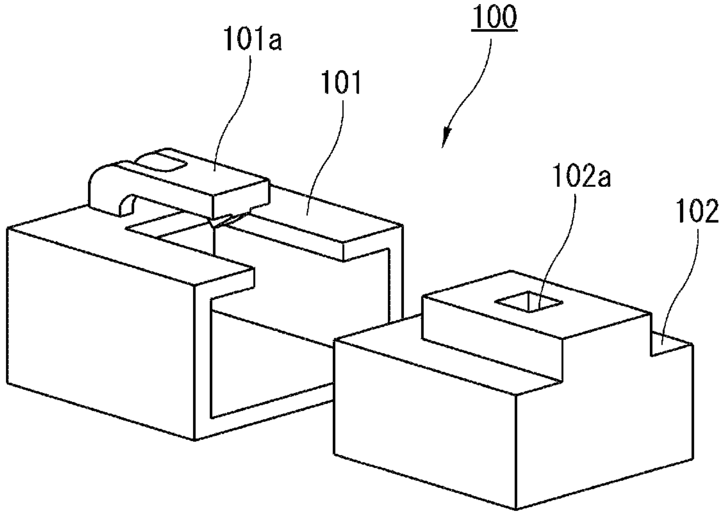
FIG. 6A is an exploded perspective view of a connector in the related art.
Figure 6B:
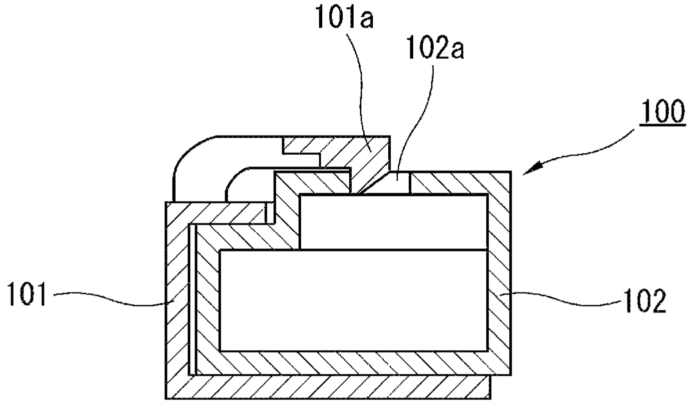
FIG. 6B is a cross-sectional view of the connector in the related art.

As shown in FIGS. 6A and 6B, in a case of the connector in the related art, the locking portion 101*a* of the first housing 101 and the locked portion 102*a* of the second housing 102 in the locked state are exposed to the outside without being protected at all. Therefore, for example, the locking portion 101*a* may be lifted by the external factor acting on the outside of the first housing 101 and the second housing 102, such as the distal end portion of the locking portion 101*a* being caught by something, the locked state of the locking portion 101*a* with respect to the locked portion 102*a* may be released, and there is still room for improvement.

In contrast, according to the connector CN of the present embodiment, the first protrusion portion 27*a* and the second protrusion portion 27*b* serving as a pair of protrusion portions that restrict the action of the external force on the distal end portion of the full locking portion 14 are provided at positions close to and facing the full locking portion 14 (full locking piece 14*c*) in the locked state in which the full locking portion 14 is locked to the full locking protrusion 24.

Therefore, the first protrusion portion 27*a* and the second protrusion portion 27*b* can block the external force acting on the full locking portion 14, and prevents the external force from directly acting on the full locking portion 14. Accordingly, it is possible to prevent the problem that the full locking portion 14 is lifted up by the external force acting on the distal end portion of the full locking portion 14 and is detached from the full locking protrusion 24.

In particular, in the present embodiment, the first protrusion portion 27*a* and the second protrusion portion 27*b* are formed on the front side of the full locking protrusion 24 in the insertion direction of the second housing 2 so as to overlap the distal end edge of the full locking portion 14 facing the top plate portion 22 in the locked state of the full locking portion 14 and the full locking protrusion 24. Therefore, it is possible to effectively block the external force acting to lift up the distal end portion (full locking piece 14*c*) of the full locking portion 14. Accordingly, it is possible to effectively prevent the problem that the distal end portion of the full locking portion 14 is lifted by the external force acting on the full locking portion 14 and the full locking portion 14 is detached from the full locking protrusion 24.

Further, when the full locking portion 14 is formed in the substantially rectangular frame shape as in the present embodiment, there is a high possibility that the full locking portion 14 is detached from the full locking protrusion 24 due to the external force acting on the corner portions of the distal end portion of the full locking portion 14.

In view of such a concern, in the present embodiment, the first protrusion portion 27*a* and the second protrusion portion 27*b* serving as the pair of protrusion portions are provided at the positions facing the corner portions on both sides of the distal end portion of the full locking portion 14.

In this way, since the first protrusion portion 27*a* and the second protrusion portion 27*b* are provided at the positions facing the corner portions on both sides of the distal end portion of the full locking portion 14, the external force acting on the corner portions on both sides of the distal end portion of the full locking portion 14 can be effectively blocked by the first protrusion portion 27*a* and the second protrusion portion 27*b*. Accordingly, it is possible to effectively prevent the problem that the corner portions of the distal end portion of the full locking portion 14 is lifted by the external force acting on the full locking portion 14 and the full locking portion 14 is detached from the full locking protrusion 24.

In the present embodiment, the first protrusion portion 27*a* and the second protrusion portion 27*b* serving as the pair of protrusions are disposed outside the full locking protrusion 24 in the width direction of the second housing 2 and at the positions not facing the full locking protrusion 24.

In this way, since the first protrusion portion 27*a* and the second protrusion portion 27*b* are disposed outside the full locking protrusion 24 in the width direction of the second housing 2 and spaced apart from each other at the positions not facing the full locking protrusion 24, when the second housing 2 is molded, the molding die of the second housing 2 can be simply divided into two in the depth direction of the second housing 2. Accordingly, productivity of the connector CN can be improved, and a manufacturing cost can be reduced.

In the present embodiment, the first protrusion portion 27*a* and the second protrusion portion 27*b* are set to have the substantially same height as that of the full locking portion 14.

In this way, since the first protrusion portion 27*a* and the second protrusion portion 27*b* are set at the substantially same height as the full locking portion 14, the entire full locking portion 14 can be protected in a height direction of the full locking portion 14 by the first protrusion portion 27*a* and the second protrusion portion 27*b*. Accordingly, it is possible to more effectively prevent a direct action of the external force on the full locking portion 14.

The present disclosure is not limited to the configurations described in the respective embodiments, and can be freely changed in accordance with the specification of an application object and the like without departing from the gist of the present disclosure.

In particular, the present embodiment describes, as the protrusion portions for preventing the direct action of the external force on the full locking portion 14, a configuration in which the protrusion portions are separated as the pair of protrusion portions including the first protrusion portion 27*a* and the second protrusion portion 27*b* that are separated from each other, and the present disclosure is not limited to such a configuration. In other words, although not specifically shown, the first protrusion portion 27*a* and the second protrusion portion 27*b* may be configured as a series of protrusion portions that are close to and face the distal end portion (full locking piece 14*c*) of the full locking portion 14. In this case, the protrusion portions can protect the distal end portion of the full locking portion 14 over the entire width direction of the second housing 2. Accordingly, it is possible to prevent the problem that the distal end portion of the full locking portion 14 is lifted up by the external force acting on the distal end portion of the full locking portion 14 and is detached from the full locking protrusion 24.

The above embodiment describes that the locked portion according to the present disclosure is configured as the protruded full locking protrusion 24, and the locking portion according to the present disclosure is configured as the full locking portion 14 having a rectangular frame shape, and a locking form of the locked portion and the locking portion according to the present disclosure is not limited to the shown form. In other words, the locked portion according to the present disclosure may be configured as the recessed locked portion like the connector of the related art, and the locking portion according to the present disclosure may be configured as the protruded locking portion like the connector of the related art, and even in this locking form, for example, with the protrusion portions according to the present disclosure such as the first protrusion portion 27*a* and the second protrusion portion 27*b*, it is possible to prevent the problem that the full locking portion is lifted up by the external force acting on the distal end portion of the full locking portion and is detached from the locked portion.

Further, the above embodiment describes, for example, a mode in which the full locking portion 14 and the temporary locking portion 15 are provided in the first housing 1 and the full locking protrusion 24 and the temporary locking protrusion 25 are provided on the second housing 2, and the full locking protrusion 24 and the temporary locking protrusion 25 may be provided on the first housing 1 and the full locking portion 14 and the temporary locking portion 15 may be provided in the second housing 2.

According to a first aspect of the present disclosure, a connector (CN) includes: a first housing (1) that accommodates a terminal fitting (4); a second housing (2) that is inserted into the first housing (1) to be fitted to the first housing (1); a locked portion (24) provided on one side surface of the second housing (2); a locking portion (14) that is provided flexibly and deformably on one side surface of the first housing (1) that faces the one side surface of the second housing (2) and is locked to the locked portion (24) to move over the locked portion (24) by becoming deformably bent along with the first housing (1) and the second housing (2) being fitted with each other; and a protrusion portion (27*a*, 27*b*) provided on the second housing (2) at a position close to and facing a distal end portion of the locking portion (14) in a locked state in which the locking portion (14) is locked to the locked portion (24), the protrusion portion (27*a*, 27*b*) being configured to restrict an action of an external force on the distal end portion of the locking portion (14) in the locked state.

According to the first aspect, the protrusion portion that restricts the action of the external force on the distal end portion of the locking portion is provided at a position close to and facing the locking portion in the locked state in which the locking portion is locked to the locked portion. Therefore, the external force acting on the locking portion can be blocked by the protrusion portion, and the external force is prevented from directly acting on the locking portion. Accordingly, it is possible to prevent a problem that the locking portion is lifted up by the external force acting on the distal end portion of the locking portion and is detached from the locked portion.

According to a second aspect of the present disclosure, the locked portion (24) may have a protruding shape. The locking portion (14) may have a substantially rectangular frame shape surrounding the locked portion (24) in the locked state. The protrusion portion (14) may be provided on a front side of the locked portion (24) in an insertion direction of the second housing (2), and is formed to overlap a distal end edge of the locking portion (14) facing the one side surface of the second housing (2) in the locked state.

According to the second aspect, since the protrusion portion is formed on the front side of the locked portion in the insertion direction of the second housing so as to overlap the distal end edge of the locking portion facing the one side surface of the second housing in the locked state, it is possible to effectively block the external force acting to lift up the distal end portion of the locking portion. Accordingly, it is possible to effectively prevent the problem that the distal end portion of the locking portion is lifted by the external force acting on the locking portion and the locking portion is detached from the locked portion.

According to a third aspect of the present disclosure, the protrusion portion (27*a*, 27*b*) may be formed at a position facing corner portions on both sides of the distal end portion of the locking portion (14) in the locked state.

According to the third aspect, when the locking portion is formed in the rectangular frame shape surrounding the locked portion, the locking portion is easily detached from the locked portion when the external force acts on the corner portions on both sides of the distal end portion of the locking portion. Therefore, by providing the protrusion portion at the positions facing the corner portions on both sides of the distal end portion of the locking portion, the external force acting on the corner portions on both sides of the distal end portion of the locking portion can be effectively blocked by the protrusion portion. Accordingly, it is possible to effectively prevent the problem that the corner portions of the distal end portion of the locking portion are lifted by the external force acting on the locking portion and the locking portion is detached from the locked portion.

According to a fourth aspect of the present disclosure, the protrusion portion (27*a*, 27*b*) may be disposed at a position outside from the locked portion (24) in the width direction of the second housing (2) and not facing the locked portion (24) in the insertion direction.

According to the fourth aspect, since the protrusion portion is disposed at the position that does not face the locked portion in the width direction of the second housing so as to be spaced apart from each other, when the second housing is molded, a molding die of the second housing can be simply divided into two in a depth direction of the second housing. Accordingly, productivity of the connector can be improved, and a manufacturing cost can be reduced.

According to a fifth aspect of the present disclosure, the protrusion portion (27*a*, 27*b*) may have a height equal to that of the locking portion (14).

According to the fifth aspect, since the protrusion portion is set at the substantially same height as the locking portion, it is possible to protect an entire full locking portion in a height direction of the full locking portion by the protrusion portion. Accordingly, it is possible to more effectively prevent a direct action of the external force on the full locking portion.

According to the present disclosure, the protrusion portion that restricts the action of the external force on the distal end portion of the locking portion is provided at the position close to and facing the locking portion in the locked state in which the locking portion is locked to the locked portion. Therefore, the external force acting on the locking portion can be blocked by the protrusion portion, and the external force is prevented from directly acting on the locking portion. Accordingly, it is possible to prevent the problem that the locking portion is lifted up by the external force acting on the distal end portion of the locking portion and is detached from the locked portion.

What is claimed is:

1. A connector comprising:

a first housing that accommodates a terminal fitting;

a second housing that is inserted into the first housing to be fitted to the first housing;

a locked portion provided on one side surface of the second housing;

a locking portion that is provided flexibly and deformably on one side surface of the first housing that faces the one side surface of the second housing and is locked to the locked portion to move over the locked portion by becoming deformably bent along with the first housing and the second housing being fitted with each other;

a first protrusion portion provided on the second housing at a position close to and facing a distal end portion of the locking portion in a locked state in which the locking portion is locked to the locked portion, the first protrusion portion being configured to restrict an action of an external force on the distal end portion of the locking portion in the locked state, the first protrusion portion includes a first surface that faces in the insertion direction; and a second protrusion portion provided on the second housing and spaced away from the first protrusion portion in a width direction, the second protrusion portion includes a second surface that faces in the insertion direction, wherein the locking portion includes a locking piece located between the first surface and the locked portion, and the locking piece is located between the second surface and the locked portion.

2. The connector according to claim 1, wherein the locked portion has a protruding shape, the locking portion has a substantially rectangular frame shape surrounding the locked portion in the locked state, and the first protrusion portion is provided on a front side of the locked portion in an insertion direction of the second housing, and is formed to overlap a distal end edge of the locking portion facing the one side surface of the second housing in the locked state.

3. The connector according to claim 2, wherein the first protrusion portion is formed at a position facing corner portions on both sides of the distal end portion of the locking portion in the locked state.

4. The connector according to claim 3, wherein the first protrusion portion is disposed at a position outside from the locked portion in the width direction of the second housing and not facing the locked portion in the insertion direction.

5. The connector according to claim 2, wherein the first protrusion portion has a height equal to that of the locking portion.

6. The connector according to claim 1, further comprising:

a temporary locked portion provided on the one side surface of the second housing and in parallel in the width direction of the locked portion; and a temporary locking portion provided on the one side surface of the first housing.

7. The connector according to claim 1, wherein the first housing includes a gap between the locking portion and a portion of an outer surface of the first housing in the width direction and the gap extends along the locking portion and the outer surface in the insertion direction, and the protrusion portion is spaced away from the gap.

* * * * *